A. F. ROUNDS.
Potato-Diggers.

No. 155,591. Patented Oct. 6, 1874.

Witnesses.
C. F. Brown
M. Church

Inventor
A. F. Rounds
by his Attys.
Hill & Ellsworth

UNITED STATES PATENT OFFICE.

ALPHONSO F. ROUNDS, OF SCRANTON, PENNSYLVANIA.

IMPROVEMENT IN POTATO-DIGGERS.

Specification forming part of Letters Patent No. 155,591, dated October 6, 1874; application filed July 9, 1874.

*To all whom it may concern:*

Be it known that I, ALPHONSO F. ROUNDS, of Scranton, in the county of Luzerne and State of Pennsylvania, have invented certain new and useful Improvements in Potato-Digger; and I do hereby declare the following to be a full, clear, and exact description of the same, reference being had to the accompanying drawings, forming part of this specification, in which—

Figure 1:
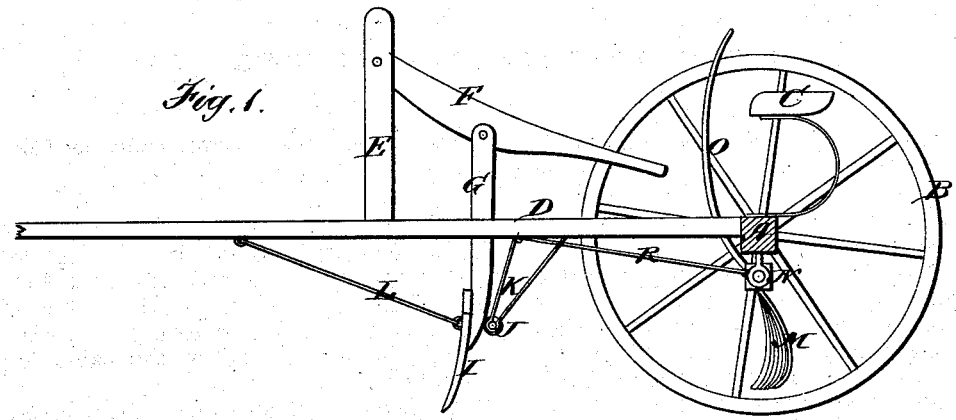
Figure 2:
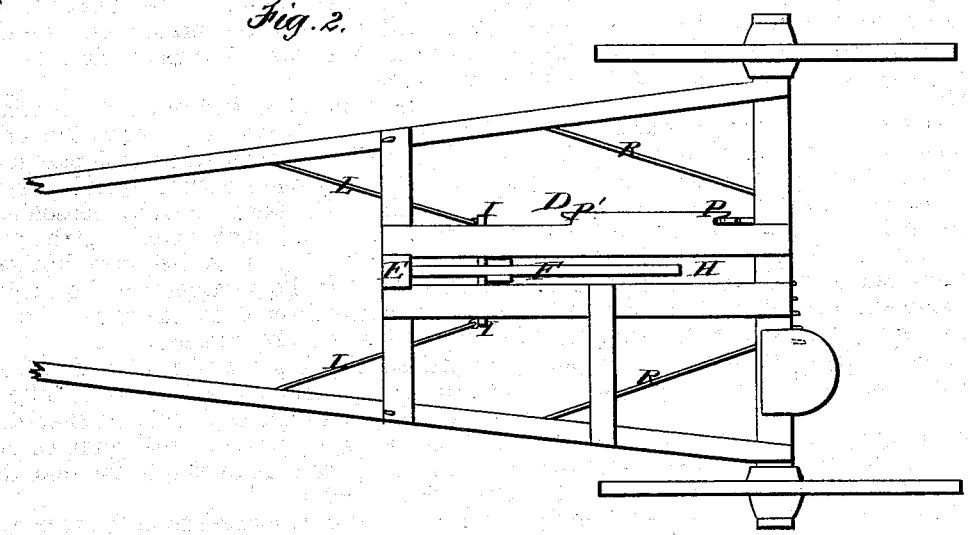
Figure 3:
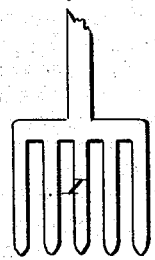
Figure 4:
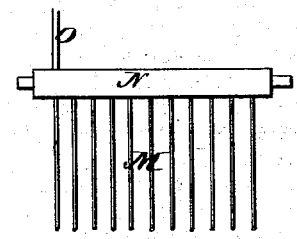

Figure 1 is a side elevation with one of the wheels removed; Fig. 2, a top plan view; and Figs. 3 and 4 are elevations of the digger and rake detached.

Similar letters of reference in the accompanying drawings denote the same parts.

This invention has for its object to provide for public use an improved potato-digger; and to this end it consists in the employment of a fork or digger adapted to be raised and lowered by a suitable lever, and a raking attachment also adapted to be raised and lowered, said fork and rake being located in a suitable frame mounted on wheels, and operating as I will now proceed to describe.

In the drawings, A represents the axle of my improved potato-digger mounted on wheels B, and provided with a seat, C. D represents a frame suitably connected to the axle, and provided at its front end with a vertical standard, E, to which is pivoted a lever, F, the latter extending backward, so as to be within easy reach of the operator. G is a vertical rod pivoted to the lever F, extending downward through a slot, H, in the frame D, and provided on its lower end with suitable prongs or teeth I, preferably like those of the ordinary digging-fork. The fork I is so located as to operate on a row of potato-hills, and is adapted to be raised and lowered by the lever F, its rod or handle G being guided by the slot H. The back side of the rod or handle G bears against a friction-roller, J, which is journaled in lugs or brackets K, depending from the lower side of the frame D, and supports the rod or handle from the rear. L L represent brace-rods extending from the fork I forward and upward to suitable points on the thills or tongue, the rods being so attached as to permit the forks to rise and fall. M represents a rake preferably composed of curved spring-teeth attached to a head, N, the latter being journaled on the under side of the axle A, behind the fork I, and in the same longitudinal line.

The head N is provided with a lever, O, which projects upward, and is adapted to engage with catches P P' on the frame D, so as to hold the rake either in an operative or raised position. R R are brace-rods extending forward from the bearings of the head N to the frame.

The operation is as follows: The machine being driven over a row of potatoes, the fork I is depressed by the operator and plunged into the ground before each hill, and raised after passing the same, thereby loosening and lifting a mass of earth containing the potatoes, and allowing it to fall in a broken condition, so that the potatoes may be easily separated and collected by the rake following or by other suitable means.

If desired, the fork may be allowed to remain in the ground instead of being lifted after passing through each hill, its effect in this case being to plow out the potatoes or so loosen the ground as to enable the rake to collect them easily.

The fork being supported from the rear by the roller J and braced from the front by the rods L is firmly held in place, and enabled to be easily raised and lowered, the friction of the rod or handle G against its back support being greatly decreased by the roller J.

The teeth of the rake M have a gradually-increasing backward inclination from one end to the other, as shown in Figs. 1 and 4; hence, when the rake is drawn through the loosened ground behind the fork, it draws the potatoes diagonally to one side of the row, the teeth on one end of the rake striking the potatoes first.

The rake may be employed or not, according to circumstances. When in use it is held in position by the engagement of its lever O with the catch P, and when not in use the lever is depressed and engaged with the catch P', thereby swinging the rake backward and holding it above the ground.

I claim as my invention—

1. In a potato-digger, the combination of the fork I, having the rod or handle G, with the lever F, slot H, supporting-roller J, and brace-rods L, substantially as and for the purpose specified.

2. In a potato-digger, the combination of the vertically-adjustable fork I and rake M, substantially as described, for the purpose specified.

To the above specification of my invention I have set my hand this 10th day of January, A. D. 1874.

ALPHONSO F. ROUNDS.

Witnesses:
 A. A. CHASE,
 MELVILLE CHURCH.